United States Patent Office 3,294,801
Patented Dec. 27, 1966

3,294,801
11- OR 12-SUBSTITUTED BENZO[a]CYCLOALKANA
[f]QUINOLIZINE AND PROCESS FOR THEIR
PRODUCTION
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Feb. 28, 1964, Ser. No. 348,286
14 Claims. (Cl. 260—286)

This invention relates to a novel 11- or 12-substituted quinolizines having the following structural formula:

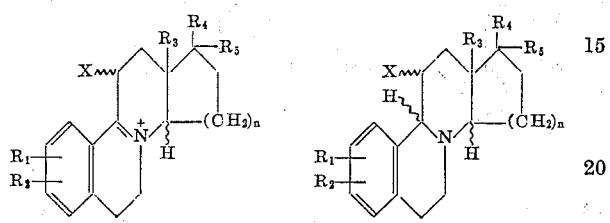

wherein $R_1$ and $R_2$ may be hydrogen, hydroxy or lower alkoxy such as methoxy, ethoxy, propoxy, and the like, $R_3$ may be hydrogen, or lower alkyl such as methyl, ethyl, propyl, butyl and the like, $R_4$ represents hydrogen, hydroxy, lower acyloxy such as acetoxy, butoxy, propoxy and the like, or lower alkoxy such as methoxy or ethoxy; $R_5$ represents hydrogen, lower alkoxy such as methoxy or ethoxy, lower alkyl such as methyl, ethyl, alkenyl such as vinyl, alkynyl such as ethynyl, —COCH₃,

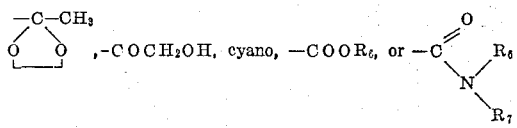, —COCH₂OH, cyano, —COOR₆, or

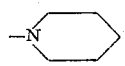

in which $R_6$ and $R_7$ may be hydrogen or lower alkyl or $R_6$ and $R_7$ taken together with the nitrogen to which they are attached form a heterocyclic radical such as

or $R_4$ and $R_5$ taken together with the carbon atom to which they are attached represent a keto radical such as

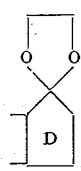

or a cyclic ketal radical such as

X may be halogen, such as chlorine, bromine, fluorine and iodine, and $n$ is an integer of 1 or 2.

When $n$ is 1, the compounds of this invention are more particularly described employing the following numbering system:

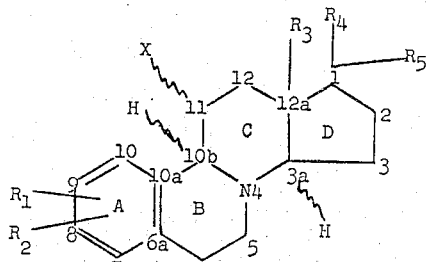

and when $n$ is 2, the compounds of this invention can be more particularly described by the following numbering system:

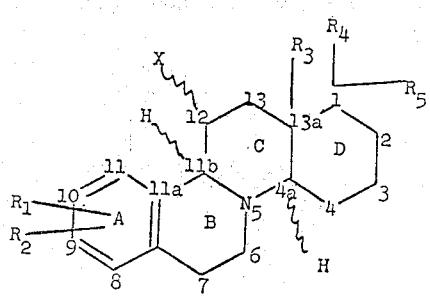

The use of a wiggly line in the above formulae denotes that the substituent X or hydrogen may be either cis- or trans-oriented with respect to $R_3$. On the other hand, the use of a solid line denotes cis-orientation and a dotted line denotes trans-orientation of the particular substituent group. The symbols $R_1$, $R_2$, $R_3$, $R_4$, $R_5$, X and $n$ used hereinafter have the same meaning as defined.

Exemplary of the compounds of this invention are:

2,3,3a,5,6,11,12,12a-octahydro-8-methoxy-11-bromo-
1H-benzo[a] cyclopental [f]quinolizinium bromide
2,3,3a,5,6,11,12,12a-octahydro-8-methoxy-11-bromo-
12a-methyl-1H-benzo[a]cyclopenta[f]
quinolizinium bromide
2,3,3a,5,6,11,12,12a-octahydro-8-methoxy-11-bromo-
1-aceto-1-hydroxy-12-methyl-1H-benzo[a]
cyclopenta[f]quinolizinium bromide
2,3,3a,5,6,11,12,12a-octahydro-8-methoxy-11-bromo-
1-aceto-12a-methyl-1H-benzo[a]cyclopenta[f]
quinolizinium bromide
2,3,3a,5,6,11,12,12a-octahydro-8-methoxy-11-bromo-
1-ethynyl-1-hydroxy-12a-methyl-1H-benzo[a]
cyclopenta[f]quinolizinium bromide
2,3,3a,5,6,11,12,12a-octahydro-8-methoxy-11-bromo-
1-(α-hydroxyaceto)-1-hydroxy-12a-methyl-1H-
benzo[a]cyclopenta[f]quinolizinium bromide
2,3,3a,5,6,11,12,12a-octahydro-8-methoxy-11-bromo-
cyano-1-hydroxy-12a-methyl-1H-benzo[a]cyclopenta
[f]quinolizinium bromide
2,3,3a,5,6,11,12,12a-octahydro-8-methoxy-11-bromo-
oxo-12a-methyl-1H-benzo[a]cyclopenta[f]
quinolizinium bromide
2,3,3a,5,6,11,12,12a-octahydro-8-methoxy-11-bromo-
1-ethynyl-1-acetoxy-12a-methyl-1H-benzo[a]
cyclopenta[f]quinolizinium bromide This invention also includes within its scope a novel process for the production of these quinolizines as well as novel intermediates useful for their production.

The compounds of this invention are related to the cyclopentanophenanthrenes and are important therapeutic agents in the treatment of vascular ailments and endocrine disorders. In addition, the novel compounds of this invention are valuable intermediates for the production of other substituted quinolizines such as those of the formula:

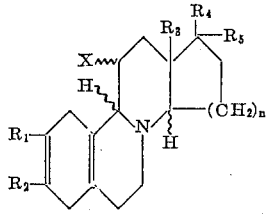

which can be readily obtained by reducing those novel compounds of this invention where $R_1$ is hydrogen and $R_2$ is lower alkoxy employing reducing agents such as lithium, sodium and potassium in solvents such as liquid ammonia.

They may also be treated with an acylating agent such as potassium formate in the presence of formic acid to form 11- or 12-acyloxy substituted quinolizines of the formula:

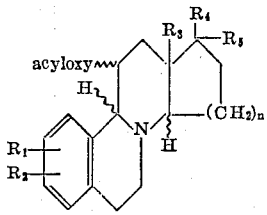

and

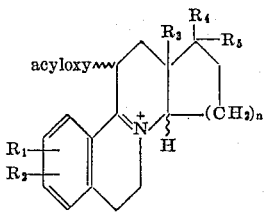

These derivatives are important therapeutic agents and are useful in the treatment of endocrine disorders.

In accordance with this invention, the compounds of this invention are produced by first treating substituted quinolizines of the formula:

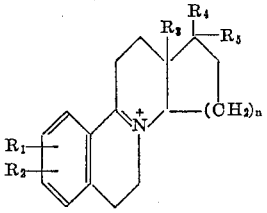

with a hydrogen acceptor such as sodium, potassium, or ammonium hydroxide to obtain an intermediate compound of the formula:

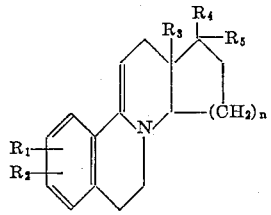

Starting materials useful in the above reaction are described and claimed in our co-pending application, Serial No. 248,872, filed January 3, 1963. The starting materials for these substituted quinolizines are keto lactams of Formula C below. These are prepared from $R_1$ and $R_2$ substituted phenylalkylamines of the general Formula A below and substituted ketoacids of the general Formula B below in accordance with the process described in our copending application Serial No. 318,190, filed October 23, 1963. The $R_1$ and $R_2$ substituted phenylalkylamines such as 3,4-diethoxyphenylethylamines are well-known compounds which are described in the literature, for example in Chemical Abstracts, vol. 56, page 10006g, and by Ide et al. in J.A.C.S., vol. 59, page 726 (1937). The ketoacids of Formula B are prepared according to the process described in our copending application Serial No. 310,146, filed September 19, 1963, using 2-$R_3$-cycloalkane-1,3-diones as starting material. Such 2-$R_3$-cycloalkane-1,3-diones are well known in the art and may be prepared according to the procedure of Panouse and Sannie published in Bull Soc. Chim. France, 1955, page 1036. See also H. Smith, J.C.S. 1964, page 4472.

The keto lactam C is then cyclized with phosphorus oxychloride and further treated in accordance with the process set forth in said copending application.

The above reaction is effected at a temperature of from about −10° to about 10° C. in an aqueous solvent.

The intermediate thus obtained is reacted with the selected halogenating agents such as bromine, N-bromo succinimide, chlorine, perchloryl fluoride and the like to obtain the desired 11- or 12-halogen substituted quinolizines containing a quaternary nitrogen and having the formula:

(I)

This halogenation reaction is effected by reacting equimolar weights of the reactants in an inert solvent such as ether or dichloromethane at low temperatures preferably in the range of about −40° C. to −70° C. The reaction product is recovered either by filtration or by removal of the solvent. The above compound having a quaternary nitrogen atom may be reduced to one having tertiary nitrogen by treatment with a complex alkali metal hydride in an inert solvent such as methanol, ethanol, and the like. Complex alkali metal hydrides suitable for this reduction include, for example, potassium borohydride or sodium borohydride.

Although treatment with the selected halogenating agent is preferred in many instances, we have also found it advantageous to introduce a particular halogen by the displacement of another halogen. Thus, for example, treatment of an 11-bromo compound with sodium iodide in acetone results in replacing the bromine to yield the corresponding 11-iodosubstituted quinolizine. Similar treatment of the 11-bromo-compound with hydrochloric acid results in the displacement of bromine to give the corresponding 11-chloro compound.

The foregoing processes in the production of compounds of this invention may be summarized in the following schematic diagram:

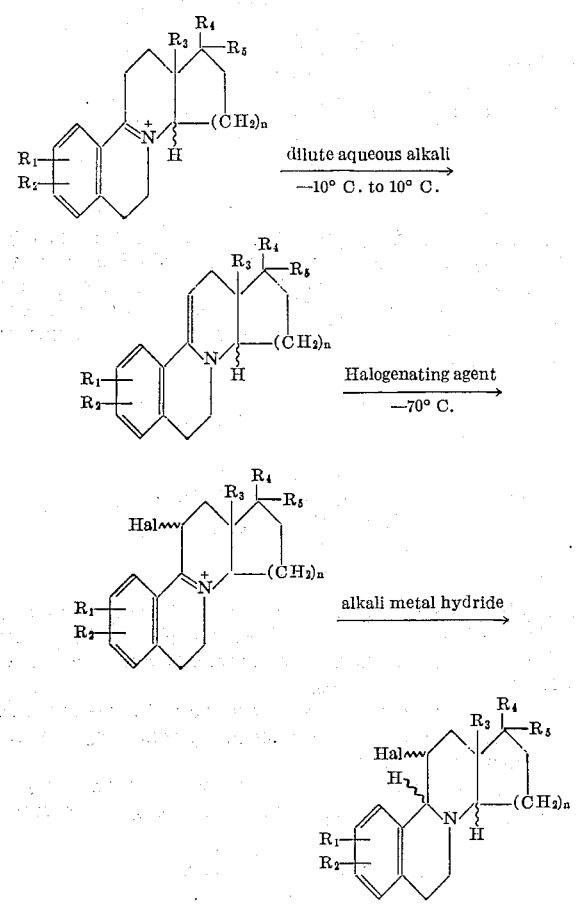

The compounds of this invention may be converted to the corresponding acid addition salts by reacting the selected acid with the base and recovering the salt by filtration. Suitable acids which may be used to form nontoxic pharmaceutically acceptable salts are, for example, hydrochloric, hydrobromic, hydroiodic, sulfuric, nitric, phosphoric, acetic, benzoic acid and the like. These acid addition salts are also within the scope of this invention.

In order to further illustrate this invention, the following examples are given:

EXAMPLE 1

*2,3,3a,5,6,11,12,12a-octahydro-8-methoxy-11-bromo-1H-benzo[a]cyclopenta[f]quinolizinium bromide*

A solution of 17.0 g. of 2,3,3a,5,6,11,12,12a-octahydro-8-methoxy-1H-benzo[a]cyclopenta[f]quinolizinium dichlorophosphate in 500 ml. of water is poured slowly into a mixture of ice and 20% sodium hydroxide solution. The precipitated base, 1,2,3,3a,5,6,12,12a-octahydro-8-methoxybenzo[a]cyclopenta[f]quinolizine, is extracted with 2 portions of 250 ml. each of ether. The combined ether solutions are dried over magnesium sulfate and then cooled to −60° C. in a Dry Ice-acetone bath. To the cooled ether solution is added dropwise with stirring over a 30 minute period a solution of 7.04 grams of bromine in 50 ml. of methylene chloride. After the addition is complete, the yellow slurry is stirred for 30 minutes at −60°, then allowed to warm up slowly to ambient temperature such as 20° C. with stirring. The solid is filtered to give 2,3,3a,5,6,11,12,12a-octahydro-8-methoxy-11-bromo-1H-benzo[a]cyclopenta[f]quinolizinium bromide as yellow crystals, M.P. 174–5°. This material contains an epimeric mixture of 11-bromo salts.

EXAMPLE 2

*2,3,3a,5,6,11,12,12a-octahydro-8-methoxy-11-bromo-12a-methyl-1H-benzo[a]cyclopenta[f]quinolizinium bromide*

In the same way as described in Example 1, a solution of 13.6 g. of 2,3,3a,5,6,11,12,12a-octahydro-1-carbethoxy-8 - methoxy - 12a - methyl - 1H - benzo[a]cyclopenta[f]-quinolizinium perchlorate in 100 ml. of acetone is converted into the free base, 1,2,3,3a,5,6,12,12a-octahydro-1 - carbethoxy - 8 - methoxy - 12a - methyl - benzo[a]cyclopenta[f]pinolizine and treated with 4.8 g. of bromine to give 2,3,3a,5,6,11,12,12a-octahydro-1-carbethoxy-8-methoxy - 11 - bromo - 12a-methyl - 1H - benzo[a]cyclopenta[f]quinolizinium bromide as yellow crystals, M.P. 161–3°. This material contains an epimeric mixture of 11-bromo salts.

EXAMPLE 3

*1,2,3,3a,5,6,10b,11,12,12a-decahydro-8-methoxy-11-bromo-benzo[a]cyclopenta[f]quinolizine*

A suspension of 5.0 g. of 2,3,3a,5,6,11,12,12a-octahydro - 8 - methoxy - 11 - bromo - 1H - benzo[a]cyclopenta[f]quinolizinium bromide in 100 ml. of methanol is treated with 5.0 g. of sodium borohydride in small portions. After the addition is complete, the solution is stirred at 25 to 30° C. for ½ hour. The solution is then diluted with 100 ml. of 5% sodium hydroxide solution. The precipitated base is filtered and washed with water. It is recrystallized from aqueous acetone to give 1,2,3,3a,5,6,10b,11,12,12a - decahydro - 8 - methoxy - 11-bromo-benzo[a]cyclopenta[f]quinolizine as white crystals, M.P. 216–7° which darkens on standing.

In accordance with the process described in Example 1 the following compounds may be produced employing the appropriate starting materials:

2,3,3a,5,6,11,12,12a-octahydro - 8 - methoxy - 11 - bromo-1 - aceto - 12a - methyl - 1H - benzo[a]cyclopenta[f] quinolizinium bromide 2,3,3a,5,6,11,12,12a-octahydro - 8 - methoxy - 11 - bromo-1 - ethynyl - 1 - hydroxy - 12a - methyl - 1H - benzo[a]cyclopenta[f]quinolizinium bromide 2,3,3a,5,6,11,12,12a-octahydro - 8 - methoxy - 11 - bromo-1 - (α - hydroxyaceto) - 1 - hydroxy - 12a - methyl 1H-benzo[a]cyclopenta[f]quinolizinium bromide 2,3,3a,5,6,11,12,12a-octahydro - 8 - methoxy - 11 - bromo-1 - cyano - 1 - hydroxy - 12a - methyl - 1H - benzo[a]cyclopenta[f]quinolizinium bromide 2,3,3a,5,6,11,12,12a-octahydro - 8 - methoxy - 11 - bromo-1 - oxo - 12a - methyl - 1H - benzo[a]cyclopenta[f] quinolizinium bromide 2,3,3a,5,6,11,12,12a-octahydro - 8 - methoxy - 11 - bromo-1 - ethynyl - 1 - acetoxy - 12a - methyl - 1H - benzo[a]cyclopenta[f]quinolizinium bromide It is to be understood that the foregoing detailed description is given merely by way of illustration and that many variations may be made therein without departing from the spirit of our invention.

Having described our invention, what we desire to secure by Letters Patent is:

1. A compound selected from the group consisting of the epimeric mixture of compounds having the formula:

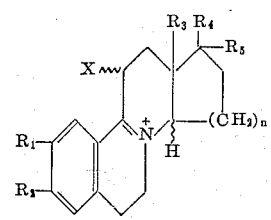

and

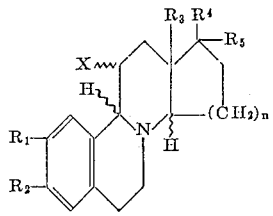

wherein $R_1$ and $R_2$ is each a member of the group consisting of hydrogen, hydroxy, and lower alkoxy, $R_3$ is a member of the group consisting of hydrogen and lower alkyl, $R_4$ is a member selected from the group consisting of hydrogen, hydroxy, and lower acyloxy of a carboxylic acid, $R_5$ is member selected from the group consisting of hydrogen, alkenyl, alkynyl, —COCH$_3$,

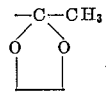

—COCH$_2$OH, cyano, —COOR$_6$ and

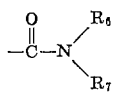

in which $R_6$ and $R_7$ are each hydrogen and $R_4$ and $R_5$ taken together with the carbon atom to which they are attached form a member selected from the group consisting of keto and cyclic ketal, X is halogen, and $n$ is an integer of from 1 to 2 and the non-toxic pharmaceutically acceptable acid addition salts thereof.

2. 2,3,3a,5,6,11,12,12a - octahydro - 8 - methoxy - 11-bromo-1H-benzo[a]cylopenta[f]-quinolizinium bromide.

3. 2,3,3a,5,6,11,12,12a - octahydro - 1 - carbethoxy-8-methoxy-11-bromo - 12a-methyl-1H-benzo[a]cyclopenta[f]quinolizinium bromide.

4. 2,3,3a,5,6,11,12,12a - octaydro - 8 - methoxy - 11-bromo - 1 - aceto - hydroxy - 12a - methyl - 1H-benzo[a]cyclopenta[f]quinolizinium bromide.

5. 2,3,3a,5,6,11,12,12a-octahydro-8-methoxy-11-bromo-1-aceto - 12a - methyl - 1H - benzo[a]cylopenta[f]quinolizinium bromide.

6. 2,3,3a,5,6,11,12,12a - octahydro - 8 - methoxy - 11-bromo - 1 - ethynyl - 1-hydroxy-12a-methyl-1H-benzo[a]cyclopenta[f]quinolizinium bromide.

7. 2,3,3a,5,6,11,12,12a - octahydro - 8 - methoxy - 11-bromo - 1 - (α-hydroxyaceto)-hydroxy-12a-methyl - 1H-benzo[a]cyclopenta[f]quinolizinium bromide.

8. 2,3,3a,5,6,11,12,12a - octahydro - 8 - methoxy - 11-bromo - 1 - cyano - hydroxy - 12a-methyl - 1H-benzo[a]cyclopenta[f]quinolizinium bromide.

9. 2,3,3a,5,6,11,12,12a - octahydro - 8 - methoxy - 11-bromo - 1 - oxo - 12a-methyl-1H-benzo[a] cyclopenta[f]quinolizinium bromide.

10. 2,3,3a,5,6,11,12,12a - octahydro - 8 - methoxy - 11-bromo - 1 - ethynl - 1 - acetoxy-12a-methyl-1H-benzo[a]cyclopenta[f]quinolizinium bromide.

11. Process for the production of a compound of the formula:

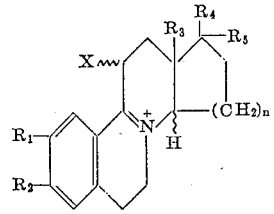

wherein $R_1$ and $R_2$ is each a member of the group consisting of hydrogen, hydroxy, and lower alkoxy, $R_3$ is a member of the group consisting of hydrogen and lower alkyl, $R_4$ is a member selected from the group consisting of hydrogen, hydroxy, and lower acyloxy of a carboxylic acid, $R_5$ is a member selected from the group consisting of hydrogen, alkenyl, alkynyl,

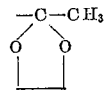

—COCH$_3$, —COCH$_2$OH, cyano, —COOR$_6$, and

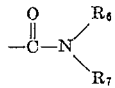

in which $R_6$ and $R_7$ are each hydrogen and $R_4$ and $R_5$ taken together with the carbon atom to which they are attached form a member selected from the group consisting of keto and cyclic ketal, X is halogen, and $n$ is an integer of from 1 to 2, which comprises treating a compound of the formula:

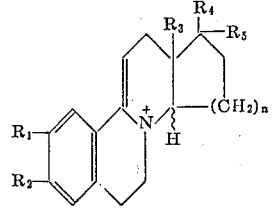

with a halogenating agent selected from the group consisting of bromine, N-bromo succinimide, chlorine and perchloryl fluoride at a temperature of about −60° C. to −70° C. in an inert solvent.

12. Process in accordance with claim 11 wherein said inert solvent is a member of the group consisting of ether, and dichloromethane.

13. A compound selected from the group consisting of the epimeric mixture of compounds having the formula:

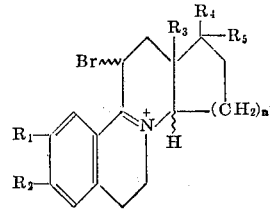

and

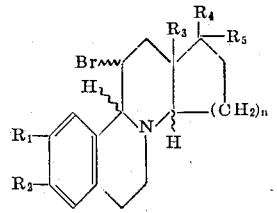

wherein $R_1$ and $R_2$ is each a member of the group consisting of hydrogen, hydroxy, and lower alkoxy, $R_3$ is a member of the group consisting of hydrogen and lower alkyl, $R_4$ is a member selected from the group consisting of hydrogen, hydroxy, and lower acyloxy of a carboxylic acid, $R_5$ is a member selected from the group consisting of hydrogen, alkenyl, alkynyl, —COCH$_3$,

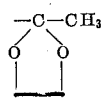

COCH$_2$OH, cyano, —COOR$_6$, and

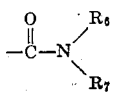

in which $R_6$ and $R_7$ are each hydrogen and $R_4$ and $R_5$ taken together with the carbon atom to which they are attached from a member selected from the group consisting of keto and cyclic ketal, and $n$ is an integer of from 1 to 2 and the non-toxic pharmaceutically acceptable acid addition salts thereof.

14. Process for the production of a compound of the formula:

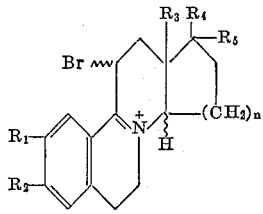

wherein $R_1$ and $R_2$ is each a member of the group consisting of hydrogen, hydroxy, and lower alkoxy, $R_3$ is a member of the group consisting of hydrogen and lower alkyl, $R_4$ is a member selected from the group consisting of hydrogen, hydroxy, and lower acyloxy of a carboxylic acid, $R_5$ is a member selected from the group consisting of hydrogen, alkenyl, alkynyl

—$COCH_3$, —$COCH_2OH$, cyano, —$COOR_6$ and

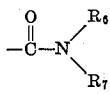

in which $R_6$ and $R_7$ are each hydrogen and $R_4$ and $R_5$ taken together with the carbon atom to which they are attached from a member selected from the group consisting of keto and cyclic ketal, and $n$ is an integer of from 1 to 2 which comprises reacting a compound of the formula:

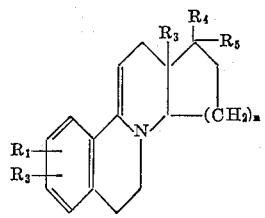

with bromine at a temperature of from about —40° to —70° centigrade.

References Cited by the Examiner
UNITED STATES PATENTS

| | | | |
|---|---|---|---|
| 3,026,322 | 3/1962 | Schock | 260—286 |
| 3,027,378 | 3/1962 | Stark | 260—286 |
| 3,132,147 | 6/1964 | Schopf et al. | 260—289 XR |
| 3,159,638 | 12/1964 | Ritchie | 260—289 XR |

OTHER REFERENCES

Bowers et al.: J. Am. Chem. Soc. vol. 82, pp. 4001–4 (1960).

Djerassi: "Steroid Reactions," Holden-Day 1963, pp. 162 and 177.

Fieser et al.: Steroids, Reinhold, 1959, pp. 593.

I.C.I. abstracted in Chemical Abstracts, vol. 60, col. 15950h and 15952a.

ALEX MAZEL, *Primary Examiner.*

HENRY R. JILES, *Examiner.*

DONALD G. DAUS, *Assistant Examiner.*